United States Patent Office 3,444,190
Patented May 13, 1969

3,444,190
2-DIMETHYLAMINO-2-METHYL-1-PROPANOL p-TOLUENESULFONATE
Scott H. Foster, Waban, James D. Larkin, West Springfield, and Charles R. Williams, Longmeadow, Mass., assignors to Monsanto Company, St. Louis, Mo., a corporation of Delaware
No Drawing. Continuation-in-part of application Ser. No. 191,751, May 2, 1962. This application Dec. 14, 1965, Ser. No. 513,818
Int. Cl. C07c *143/28, 143/38*
U.S. Cl. 260—501.19        1 Claim This invention relates to a thermosettable aminoplast resin system having a particular latent curing catalyst incorporated therein.

This application is a continuation-in-part of copending application Ser. No. 191,751, filed May 2, 1962.

Thermosettable aminoplast resins, generally of the melamine-formaldehyde type, are used extensively in preparing thermoset plastic dinnerware and thermoset decorative laminates. The aminoplast resins employed therein contain a latent curing catalyst. The purpose of the latent curing catalyst is not only to increase the rate of curing of the aminoplast resin but also to enhance the cured physical properties of the aminoplast resin. The physical properties of the finished articles are substantially better than the physical properties of a cured aminoplast resin system containing only the resin.

One particular latent curing catalyst which has been used successfully is that which is set forth in U.S. Patent 2,326,727. However, this particular catalyst has several drawbacks particularly poor stability to "yellowing." Stated more positively, when an aminoplast resin system containing the latent curing catalyst as described in U.S. Patent 2,326,727 is used to prepare thermoset decorative laminates or thermoset plastic dinnerware, the finished article has poor clarity because of discoloration thereof due to the latent curing catalyst employed therein. In addition, another drawback is that the thermoset decorative laminate cannot be postformed successfully.

Therefore, it is an object of this invention to provide an aminoplast resin system employing a particular latent curing catalyst.

Another object of this invention is to provide a decorative laminate wherein the print sheet or the overlay sheet or both is impregnated with an aminoplast resin system employing the particular latent during catalyst.

Briefly, the above and other objects of this invention are attained by employing a particular latent curing catalyst with a thermosettable aminoplast resin, wherein the particular latent curing catalyst is an acid salt of certain tertiary amines.

The following examples are set forth to illustrate more clearly the principle and practice of this invention to those skilled in the art and are not to be construed as limitations on the invention. Unless otherwise indicated, all parts and percentages are on a weight basis.

EXAMPLE I

This example is set forth to show the preparation of the various latent curing catalyst systems.

Part A

An aqueous solution of the hydrochloric acid salt of 2-dimethylamino-2-methyl propanol-1 is prepared by slowly adding an aqueous solution of hydrochloric acid containing 35 parts of hydrochloric acid and, correspondingly, 65 parts of water to an aqueous solution containing 35 parts of 2-dimethylamino-2-methyl propanol-1 and, correspondingly, 65 parts of water until the pH of the reaction is about 8.0. The temperature of the reaction is held at about 30° C. The resulting aqueous solution is the hydrochloric acid salt of 2-dimenthylamino-2-methyl propanol-1.

Part B

An aqueous solution of the para-toluene sulfonic acid salt of 2-dimethylamino-2-methyl propanol-1 is prepared by slowly adding an aqueous solution of 35 parts of paratoluene sulfonic acid and, correspondingly, 65 parts of water to an aqueous solution of 35 parts of 2-dimethylamino-2-methyl pronpanol-1 and, correspondingly, 65 parts of water until the pH of the reaction is about 8.0. The temperature of the reaction is held at about 30° C. The resulting aqueous solution is the para-toluene sulfonic acid salt of 2-dimethylamino-2-methyl propanol-1.

Part C

Part B is repeated except that sodium hydroxide is used in place of the 2-dimethylamino-2-methyl propanol-1 and an aqueous solution of para-toluene sulfonic acid-sodium hydroxide is prepared.

Part D

Part A is repeated except that triethanolamine is used in place of the 2-dimethylamino-2-methyl propanol-1 and an aqueous solution of the hydrochloric acid salt of triethanolamine is prepared herein.

Part E

Part A is repeated except that 2-amino-2-methyl propanol-1 is used in place of the 2-dimethylamino-2-methyl propanol-1 and an aqueous solution of the hydrochloric acid salt of 2-amino-2-methyl propanol-1 is prepared herein.

EXAMPLE II

Each of the latent curing catalysts of Example I are added separately to individual solutions of a melamine-formaldehyde resin which solutions are prepared by dissolving 50 parts of a melamine-formaldehyde resin in 50 parts of a mixture of 4% ethanol and 96% water. The melamine-formaldehyde resin employed herein is prepared by the condensation reaction of about 3 mols of formaldehyde per mol of melamine in the presence of an alkaline catalyst. The resin also contains therein about 5 weight percent of para-toluene sulfonamide.

The amount of latent curing catalyst added to the melamine-formaldehyde solution is determined on the basis of dry rubber, i.e., the amount of catalyst necessary to effect setting up 1 gram of the total resin and catalyst at 260° F. (±1° F.) on a hot surface. Using the dry rubber as a basis for this determination, each designated resin solution contains the following amounts of catalyst based on the weight of the resin solids:

TABLE I

| Solutions | Latent curing catalyst |
|---|---|
| A | 0.6 weight percent of the aqueous solution of the hydrochloric acid salt of 2-dimethylamino-2-methyl propanol-1. |
| B | 0.6 weight percent of the aqueous solution of the para-toluene sulfonic acid salt of 2-dimethylamino-2-methyl propanol-1. |
| C | 6.0 weight percent of the aqueous solution of the para-toluene sulfonic acid-sodium hydroxide. |
| D | 10.3 weight percent of the aqueous solution of the hydrochloric acid salt of triethanolamine. |
| E | 0.6 weight percent of the aqueous solution of the hydrochloric acid salt of 2-amino-2-methyl propanol-1. |

EXAMPLE III

Solutions A, B, C, D and E of Example II are used to impregnate alpha-cellulose overlay paper sheets and alpha-cellulose print paper sheets. The impregnated paper sheets are dried in an air-circulating oven at about 100° C. for about 6 minutes. The paper sheets have a volatile content of about 7%. The treated overlay and print paper sheets are assembled with appropriate treated phenolic core stock in a press and pressed into decorative laminates under a pressure of about 1000 lbs./sq. in. and at a temperature of about 260° F. for about 10 minutes.

The laminates so prepared are designated to correspond to the same designated solution and are then observed and compared for the various properties as set forth in Table II.

TABLE II

| Sample | Discoloration | Gloss | | | Postformability [2] |
|---|---|---|---|---|---|
| | | Room temperature | 2 hours boiling water | Hot oil [1] (180° C.) | |
| A | Clear | Excellent | Excellent | Good | Excellent |
| B | do | do | do | do | Do. |
| C | Yellow | Fair | Fair | Fair | Failure. |
| D | do | do | do | do | Do. |
| E | do | Excellent | Excellent | Good | Do. |

[1] Hot oil test—Aluminum container containing 8 oz. of oil at 180° C. and placed on surface of laminate for 20 minutes.
[2] Postformability—Ability of sample to form a 90° angle of curvature of about 1" radius without cracking of sample.

EXAMPLE IV

The aqueous solution of the para-toluene sulfonic acid salt of 2-dimethylamino-2-methyl propanol-1 of Example I, Part B, is added to a melamine-formaldehyde solution as prepared in Example II. The amount added is about 8% of the solution based on the weight of melamine-formaldehyde resin solids.

The resulting resin solution is used to treat alpha-cellulose overlay paper sheets which are dried to a volatile content of about 7% at about 100° C. in an air-circulating oven. The treated paper is assembled with appropriate dinnerware core stock and pressed at about 1200 lbs./sq. in. for about 45 seconds at a temperature of about 320° F.

The finished sample is observed to be free of discoloration due to "yellowing." This example shows that even when high amounts of the latent curing catalyst of this invention are used, no discloration or "yellowing" occurs.

This invention is directed to a thermosettable aminoplast resin system comprising a thermosettable aminoplast resin and a latent curing catalyst. More particularly, it is directed to a latent curing catalyst, which is the acid salt of certain tertiary amines. The amount of the latent curing catalyst to be employed with the thermosettable aminoplast resin is 0.01–8.0 weight percent and preferably 0.1–5.0 weight percent based on the weight of the aminoplast resin employed herein.

To describe more fully the certain tertiary amines to be employed in the practice of this invention to prepare the acid salt thereof, the tertiary amines are defined by the general formula:

wherein $R_1$, $R_2$ and $R_3$ of the above formula are independently selected from the group consisting of a methyl radical and an organic radical corresponding to the general structure:

wherein R′, R″ and R‴ are independently selected from the group consisting of an alkyl radical containing 1–4 carbon atoms and an alkyl alcohol radical containing 1–4 carbon atoms. Exmples of some of the tertiary amines which can be employed in the practice of the invention to prepare the acid salt thereof are trimethylamine; dimethyl tertiarybutylamine; methyl ditertiary butylamine; tristertiary butylamine; tris (hydroxy methyl) dimethylamino methane; tris (hydroxy tertiarybutyl) amine; 2-dimethylamino-2-methyl propane; 2-dimethylamino-2-methyl pentanol-1; 3-dimethylamino - 3 - ethyl 1,5-penpane diol; 2-dimethylamino-2-methylol 1,3-propane diol; 2-dimethylamino-2-methyl butane; 2-dimethylamino - 2-methyl pentanol-1; 3-dimethylamino - 3 - ethyl 1,5-pentane diol; 2-dimethylamino-2-methylol hexanol-1; 3-dimethylamino - 3-ethyl hexane; 4-dimethylamino-4-propyl heptanol-1; 4-dimethylamino-4-methyl 1,8 octane diol; 5-dimethylamino - 5 - methyl nonane; 5-dimethylamino-5-butyl 1,9 nonane diol; 2-methyl tertiarybutylamino-2-methyl propanol-1; 3-methyl tertiarybutylamino-3-ethyl 1,6 hexane diol; 5-methyltertiarybutylamino-5-butyl nonane; 2-ditertiarybutylamino-2-methyl propanol-1; and the like. The preferred tertiary amine to be employed in the practice of this invention is 2-dimethylamino-2-methyl propanol-1 wherein in the above general formula $R_2$ and $R_3$ are methyl groups and $R_1$ is an organic radical corresponding to the above general structure wherein R′ and R″ are methyl groups and R‴ is the methylol group.

When preparing the acid salt of the tertiary amines of this invention, the acid which is employed herein may be any of the inorganic or organic acids. Typical examples of the acids which can be employed in place of those acids set forth in Example I of this invention are sulfonic, sulfuric, phosphoric, nitric, hydrochloric, oxalic, tartaric, acetic, formic and phthalic. The preferred acid to be employed in preparing the acid salt of the tertiary amine is hydrochloric acid.

The particular latent curing catalyst of this invention can be prepared in any of a number of ways, all of which are known to those having ordinary skill in the art. For example, in preparing the hydrochloric acid salt of 2-dimethylamino-2-methyl propanol-1, slowly add an aqueous solution of hydrochloric acid to an aqueous solution of 2-dimethylamino-2-methyl propanol-1 until the pH of the mixture is about 8.0. Generally, it is advisable to keep the reaction temperature of the mixture below 40° C. The resulting solution is then an aqueous solution containing the hydrochloric acid salt of 2-dimethylamino-2-methyl propanol-1, which solution is ready for use with an aminoplast resin when the resin is converted to a solution form for impregnating applications. Alternatively, the aqueous solution of the hydrochloric acid salt of 2-dimethylamino-2-methyl propanol-1 can be reduced to the solid state and then be incorporated with a powdered thermosettable aminoplast resin before converting the system to a liquid for impregnation purposes.

Any of the aminoplast resins are suitable for use in the practice of this invention. However, particularly useful are the melamine-formaldehyde type of aminoplast resins which are prepared by the condensation reaction of 1.5–6.0 mols of formaldehyde per mol of melamine in the presence of an alkaline catalyst. The melamine-formaldehyde resins may also have incorporated therein certain modifying materials such as thiourea, toluene sulfonamide, sucrose or mixtures thereof. Also certain plasticizers may be added to or incorporated therein such as benzene sulfonamide, substituted guanamines, glucosides, sucrose, carbamates, polyhydroxy compounds, etc., which plasticizers aid in the postformable properties of the decorative laminate prepared therefrom. Other aminoplast resins which can be employed in the practice of this invention are urea formaldehyde, urea acetaldehyde, urea butyraldehyde, butylated melamine formaldehyde, melamine acetaldehyde, melamine butyraldehyde and the melamine formaldehyde resin set forth in U.S. Patent 2,852,489. The preferred aminoplast resin to be employed in the practice of this invention is the melamine-formaldehyde resin having incorporated therewith 1–20 weight percent of toluene sulfonamide based on the weight of the melamine-formaldehyde and 5–35 weight percent of sucrose based on the total weight of melamine, sucrose and formaldehyde.

The thermosettable aminoplast resin system of this invention can be used to prepare thermoset decorative laminates. For example, inert filler sheets or alpha-cellulose paper, viscose rayon paper, glass cloth or cloth prepared from cotton, wool or synthetic fibers are impregnated with about 30–80 weight percent of the resin and then dried to a specified volatile content generally in the order of 3–10%. An assembly of such resin impregnated sheets is then subjected to a pressure in the order of 100–2000 lbs./sq. in. and is heated for a period of time ranging from 5–60 minutes at a temperature of 200–300° F.

Decorative laminates prepared by the above-described process are generally an assembly of (1) a rigid substrate, (2) a thermoset aminoplast resin impregnated decorative print sheet, i.e., a paper sheet having a design printed thereon, and (3) a thermoset aminoplast resin impregnated top or overlay sheet. In the decorative laminate, the rigid substrate may consist of any suitable material such as plywood, a resin bonded wood fiberboard, or the like, a plurality of resin-impregnated sheets, etc. The resins commonly used to impregnate the resin-impregnated sheets are of the phenol-formaldehyde type. The print sheet or overlay sheet or preferably both of the rigid thermoset resin-bonded decorative laminate assembly is impregnated with the thermosettable aminoplast resin system of this invention.

The thermosettable aminoplast resin system of this invention is also suitable for use in preparing decorative laminates having postforming properties. In such a laminate, the rigid substrate may be of a postformable material such as a plurality of paper sheets (preferably creped), impregnated with a specially formulated postformable phenolformaldehyde type of thermosettable resin. The print sheet or the overlay sheet or both can then be impregnated with the resin of this invention, which decorative laminate would then have the desired characteristics as set forth previously.

In addition, the thermosettable aminoplast resin system of this invention can be employed to prepare thermoset plastic dinnerware. Generally, an overlay sheet of rayon or alpha-cellulose paper, commonly known as dinnerware foil, is impregnated with the resin system of this invention. However, a greater quantity of the latent curing catalyst is employed with the aminoplast resin in relationship to that which is used with the aminoplast resin to prepare decorative laminates. An assembly of the materials is then subjected to a pressure of about 500–3000 lbs./sq. in. and is heated for a period of time ranging from about 15 seconds to about 180 seconds and at a temperature of about 300–350° F.

The aminoplast resin system of this invention can also be used in such other applications as the bonding of fibers to form fibrous structures which are used as oil filters, water filters, air filters, etc., as orthopedic resins and as the bonding of wood veneer to form laminated plywood structures.

The outstanding advantage of the thermosettable aminoplast resin system of this invention is found in the latent curing catalyst employed therein, which catalyst does not discolor by "yellowing." This particular feature is of definite advantage because of the sales appeal and beauty of the decorative laminate or dinnerware not being impaired by discoloration. In addition, the decorative laminates prepared with the resin system of this invention have better gloss and improved resistance to boiling water or hot oil.

It will thus be seen that the objects set forth above, among those made apparent from the description, are efficiently attained, and since changes may be made in carrying out the above process and in the composition set forth without departing from the scope of this invention, it is intended that all matters contained in the above description shall be interpreted as illustrative and not in a limiting sense.

What is claimed is:

1. 2-dimethylamino-2-methyl - 1 - propanol p-toluenesulfonate.

References Cited

UNITED STATES PATENTS

| | | | |
|---|---|---|---|
| 2,467,160 | 4/1949 | Scott | 260—67.6 |
| 2,687,397 | 8/1954 | Dannenberg | 260—17.3 |
| 2,750,355 | 6/1956 | Ledden | 260—67.6 |
| 2,871,209 | 1/1959 | Shelley | 260—70 |
| 3,082,180 | 3/1963 | Boldizar | 260—67.6 |
| 3,161,561 | 12/1964 | Laurie | 260—67.6 |
| 3,131,116 | 4/1964 | Pounds | 161—263 |
| 3,293,324 | 12/1966 | Tropp | 260—850 |

WILLIAM H. SHORT, *Primary Examiner.*

E. M. WOODBERRY, *Assistant Examiner.*